United States Patent [19]

Fabre et al.

[11] Patent Number: 4,976,939

[45] Date of Patent: Dec. 11, 1990

[54] PROCESSING OF RARE EARTH ORES

[75] Inventors: Frederic Fabre, Paris; Jean-Paul Tognet, La Rochelle; Claude Magnier, Paris, all of France

[73] Assignee: Rhone-Poulenc Specialites Chimiques, Courbevoie, France

[21] Appl. No.: 518,340

[22] Filed: May 3, 1990

Related U.S. Application Data

[63] Continuation of Ser. No. 147,534, Jan. 25, 1988, abandoned, which is a continuation of Ser. No. 905,393, Sep. 10, 1986, abandoned.

[30] Foreign Application Priority Data

Sep. 10, 1985 [FR] France .............................. 85 13383

[51] Int. Cl.$^5$ ............................................... C01F 1/00
[52] U.S. Cl. ..................................... 423/21.1; 423/11
[58] Field of Search ................... 423/2, 11, 21.5, 21.1, 423/252

[56] References Cited

U.S. PATENT DOCUMENTS

| | | | |
|---|---|---|---|
| 2,783,125 | 2/1957 | de Ronden et al. | 423/252 |
| 2,811,411 | 10/1957 | Calkins | 423/11 |
| 2,815,264 | 12/1957 | Calkins et al. | 423/252 |
| 2,838,370 | 6/1958 | Calkins | 423/7 |
| 3,619,128 | 11/1971 | Angstadt | 423/21.1 |
| 4,461,748 | 7/1984 | Sabot et al. | 423/21.5 |
| 4,726,938 | 2/1988 | Rollot et al. | 423/21.5 |
| 4,744,960 | 5/1988 | Floreancig et al. | 423/21.5 |

FOREIGN PATENT DOCUMENTS 2084556  4/1982  United Kingdom .

OTHER PUBLICATIONS

Bearse et al., "Thorium and Rare Earths from Monazite", *Chem. Eng. Prog.*, vol. 50, No. 5 (1954), pp. 235–239.

Jamrack, "Rare Metal Extraction", *Chemical Engineering Techniques*, MacMillan Co., N.Y. (1963), pp. 32–35.

Krumholz, "Brazilian Practice for Monazite Treatment", Symposium on Rare Metals (Dec. 1–3, 1957), Organized by United Nations Educational Scientific & Cultural Organisation, Atomic Energy Establishment, and the Indian Institute of Metals, pp. 78–82.

Sethna, et al., "Treatment of Monazite Sands with Special Reference to Indian Practice", Symposium on Rare Metals (Dec. 1–3, 1957), Organized by United Nations Educational Scientific & Cultural Organisation, Atomic Energy Establishment, and the Indian Institute of Metals, pp. 68–77.

Cronan, "Which Process to Free Rare Earths", *Chem. Eng.*, vol. 66 (Jul. 27, 1959), pp. 62, 64, and 104.

*Primary Examiner*—Edward A. Miller
*Attorney, Agent, or Firm*—Burns, Doane, Swecker & Mathis

[57] ABSTRACT

Rare earth hydroxides are recovered from the rare earth ores, e.g., monazite, xenotime and/or bastnasite, by treating the ore with an aqueous solution of an alkali metal hydroxide, under agitation and essentially constant pressure, at a temperature of from about 100° to 220° C., and wherein the ratio by weight of alkali metal hydroxide/ore ranges from about 1.4 to 0.5, e.g., a weight ratio of sodium hydroxide/ore of from about 1 to 0.5, or a weight ratio of potassium hydroxide/ore of from about 1.4 to 0.7.

12 Claims, No Drawings

PROCESSING OF RARE EARTH ORES

This application is a continuation of application Ser. No. 07/147,534, filed Jan. 25, 1988, which is a continuation of application Ser. No. 06/905,393, filed Sept. 10, 1986, both abandoned.

CROSS-REFERENCE TO RELATED APPLICATION

Our copending application Ser. No. 905,346, filed concurrently herewith, and assigned to the assignee hereof.

BACKGROUND OF THE INVENTION

1. Field of the Invention

The present invention relates to the treatment of rare earth ores, and, more especially, to the processing of rare earth ores with concentrated aqueous solutions of alkali metal hydroxides to recover rare earth values in hydroxide form therefrom.

2. Description of the Prior Art

Industrial processes known to this art for treating rare earth ores generally consist of grinding an ore such as monazite very thoroughly, either dry or in water, then treating the ground ore with a concentrated aqueous sodium hydroxide solution at high temperature. U.S. Pat. No. 2,811,411, for example, describes a process wherein the grinding is carried out in such fashion that in the ground ore 100% of the particles pass through a 74 micrometer mesh sieve and 95 to 98% through a 44 micrometer mesh sieve. The ground ore is then treated with a 30 to 70% by weight sodium hydroxide solution at temperatures of 135° to 220° for periods of 1 to 3 hours, with a weight ratio of sodium hydroxide to ore of 2 to 3. This results in a quite heavy consumption of sodium hydroxide.

Furthermore, the reaction is typically carried out in an autoclave (see, e.g., British Patent No. 2,084,556). The concentration of sodium hydroxide in the reaction medium then decreases upon passage of time, because the sodium hydroxide is consumed in the reaction. The concentration is, therefore, lower upon completion of the reaction than it was at the beginning. The reaction conditions for the ore consequently become more gentle, which does not favor obtaining high reaction yields in a limited time.

To avoid these disadvantages, the known processes use a large excess of reagent (initial weight ratio (NaOH/ore) of 2 or more) and also use a very high initial concentration of sodium hydroxide. The latter requirement involves using anhydrous sodium hydroxide, which is expensive.

SUMMARY OF THE INVENTION

Accordingly, a major object of the present invention is the provision of an improved such process which conspicuously avoids the disadvantages and drawbacks of the aforesaid industrial processes, and which, in particular, has the advantage of producing a better reaction with the rare earth ore, under economically far more advantageous conditions.

Briefly, the present invention features a method of treating rare earth ore with a concentrated aqueous alkali metal hydroxide solution to recover the rare earths values in hydroxide form therefrom, and wherein the ore is treated, while under agitation at a temperature of about 100° to 220° C. and constant pressure, with an amount of alkali metal hydroxide such that the weight ratio of sodium hydroxide/ore is less than about 1 and at least about 0.5, or the weight ratio of potassium hydroxide/ore is less than about 1.4 and at least about 0.7.

DETAILED DESCRIPTION OF THE PREFERRED EMBODIMENTS OF THE INVENTION

More particularly according to the present invention, the rare earth ore is advantageously treated with an alkali metal hydroxide, such as sodium hydroxide, potassium hydroxide, or mixtures thereof.

It is preferred to use sodium hydroxide.

The amounts and concentrations of sodium hydroxide used will be more fully described hereinafter. These can easily be extrapolated by one skilled in this art, should the sodium hydroxide be replaced by a different alkali metal hydroxide.

The rare earth ores employed in the method of the invention are all ores that can be treated with an alkali metal hydroxide. Thus, the materials particularly suitable for treatment are phosphates containing rare earths, particularly monazite and xenotime, and fluocarbonates containing rare earths, such as bastnasite, and also mixtures thereof, such as monazite with bastnasite.

Consistent herewith, by the term "rare earths" are intended those elements of the Periodic Table having atomic numbers from 57 to 71 and yttrium (atomic no. 39). The rare earth ores treated according to this invention may contain these elements, or values, in widely varying amounts.

The rare earth ores processed according to this invention are preferably ores which have been at least coarsely ground. They may equally as well be unground ores, if the particle size is sufficiently fine.

The grinding may be carried out in conventional manner, either dry or in water. However, it is preferable to grind the ore in the presence of a concentrated aqueous solution of sodium hydroxide at a temperature of 100° C. or less.

The total amount of sodium hydroxide present during the treatment proper is such as to provide a sodium hydroxide/ore weight ratio of 0.5 to less than 1, said ratio referring to the dry weight thereof. It preferably ranges from about 0.80 to 0.95, inclusive.

An important feature of the invention is that the process is carried out at constant pressure. It may advantageously be atmospheric, although constant pressures of up to $3 \cdot 10^6$ Pa may be used.

Under these conditions, the concentration of sodium hydroxide in the reaction medium is maintained at a constant level because of evaporation of water, such level being fixed by the temperature used in respect of each working pressure. This is very helpful in obtaining high yields, since the reaction conditions remain equally as harsh upon completion of the reaction as they were at the beginning. The process of the invention consequently limits the excess sodium hydroxide which has to be used, and provides an overall savings over conventional processes.

The temperature advantageously ranges from 100° to 220° and preferably from 130° to 180° C.

The concentration of the sodium hydroxide solution (which is governed by pressure and temperature), as a practical matter, ranges from 20 to 65% by weight. It is preferable to use a 48 to 50% by weight commercial soda lye.

It has also now been determined that, for a given pressure, the kinetics of the reaction is an increasing function of the concentration of sodium hydroxide and thus of temperature, but that the yield decreases beyond a certain temperature. For each pressure, there is thus an optimum range of temperatures which will give both a fast reaction and high yields. Moreover, beyond certain concentrations of sodium hydroxide, problems of fluidity of the reacting solution are encountered.

Thus, another feature of the invention is that the temperature is adjusted to a value substantially corresponding to the optimum value. The optimum value may easily be determined by preliminary tests for each pressure level.

For example, when the process is carried out at atmospheric pressure, the optimum temperature range is from about 145° to 165° C., corresponding to a sodium hydroxide concentration of approximately 50 to 62%. This range increases to higher temperatures, when the pressure increases.

The process of this invention makes it possible:
(i) to obtain reaction yields higher than those obtained in a closed system (autoclave), at an uncontrolled pressure;
(ii) to produce faster reactions;
(iii) to enable substantial savings in reagents, since the (NaOH/ore) ratio is less than 1; and
(iv) to effect reaction with coarsely ground, or even unground ores, which reaches equilibrium at the same time as a reaction with very finely ground ores in an autoclave, and thus to save energy (in grinding) while obtaining equal productivity.

In order to further illustrate the present invention and the advantages thereof, the following specific examples are given, it being understood that same are intended only as illustrative and in nowise limitative.

EXAMPLE 1

An Australian monazite having the composition given in the following table was ground to a size such that the residue retained on a 40 micrometer sieve was 15% by weight.

| CONSTITUENTS | PERCENTAGE BY WEIGHT |
|---|---|
| $ThO_2$ | 6.7% |
| Rare earth oxides | 59.3% |
| $P_2O_5$ | 26.5% |
| $SiO_2$ | 3.1% |
| $ZrO_2$ | 3.0% |

When the monazite had been ground, it was reacted with an aqueous sodium hydroxide solution in a reactor, wherein it was agitated under the following conditions:
(a) Atmospheric pressure;
(b) Initial (NaOH/ore) weight ratio=0.85;
(c) Concentration of sodium hydroxide solution used =48% by weight (commercial lye);
(d) Temperature maintained from 140° to 150° C.

After 3 hours, the reaction yield (degree of conversion of rare earth phosphates and thorium phosphates to the corresponding hydroxides) was 97.5%.

COMPARATIVE EXAMPLE

This example, which is given by way of comparison, indicates the importance of the process according to the present invention as compared with the prior art method as described in U.S. Pat. No. 2,822,411.

One ton of Australian monazite, having the same composition as that in Example 1, was ground dry to a particle size such that the residue retained on a 40 micron sieve was 5%. The ground monazite and a 48% sodium hydroxide solution were placed in a closed, agitated reactor (an autoclave); the weight ratio of sodium hydroxide/ore was 3, the temperature of the reactor was from 160° to 170° C. and the reaction time was 3 hours.

Under these conditions, that is to say, despite the considerable excess of sodium hydroxide and the thorough grinding of the ore, the proportion reacted was only 93%.

EXAMPLE 2

The same monazite as in Example 1, ground to the same size as in the comparative example (5% residue on 40 micron sieve) was reacted according to the process of the invention, in a reactor which was agitated under the following conditions:
(a) Atmospheric pressure;
(b) 152.5° C.;
(c) [NaOH]=55.6% by weight;
(d) Weight ratio (NaOH/ore)=0.95

The reaction reached equilibrium in 20 minutes and the yield was then 97.2%.

This example evidences that the reaction, under less harsh temperature conditions, was more effective according to the invention than in the comparative example, and was also extremely rapid.

EXAMPLE 3

Australian monazite was graded between 80 and 100 microns. The 80–100 micron fraction was reacted, without being ground, in a reactor which was agitated under the following conditions:
(a) Atmospheric pressure;
(b) [NaOH]=52% by weight;
(c) Temperature=147.8° C.;
(d) Weight ratio (NaOH/ore)=0.95

The reaction reached equilibrium in 3 hours, 30 minutes, and the yield was 95.1%.

This example evidences that the process of the invention made it possible to obtain yields as high as in Example 2, under less harsh temperature conditions, and above all without the ore having to be ground beforehand.

EXAMPLE 4

Australian monazite was ground as in Example 2.

It was reacted in a reactor which was agitated under the following conditions:
(a) Atmospheric pressure;
(b) Temperature=167° C.;
(c) [NaOH]=63.05 by weight;
(d) Weight ratio (NaOH/ore)=0.95

Equilibrium was reached in only 15 minutes, but the yield was only 91%. This example indicates the limits which must be observed, if the yields are not to suffer.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of rare earth hydroxides, comprising treating a rare earth ore with an aqueous solution of sodium hydroxide having a concentration of from about 20 to about 65% by weight under agitation and essentially constant pressure while maintaining the concentration at essentially constant level, at a temperature of from about 100° C. to about 200° C., with the proviso that the temperature is selected such that water will be evaporated during processing, and wherein the ratio by weight of sodium hydroxide/ore ranges from about 0.95 to about 0.5.

2. A process according to claim 1 wherein the aqueous solution of sodium hydroxide has a concentration of from about 50 to about 62% by weight.

3. A process according to claim 1, wherein the aqueous solution of sodium hydroxide has a concentration of from about 48% to about 62% by weight and said temperature is selected from the range of about 130° C. to about 165° C.

4. The process as defined by claim 1, said ratio by weight ranging from about 0.80 to 0.95.

5. The process as defined by claim 1, said essentially constant pressure ranging from atmospheric to about $3 \cdot 10^6$.

6. The process as defined by claim 5, said essentially constant pressure being atmospheric pressure.

7. The process as defined by claim 1, said temperature ranging from about 130° to 180° C.

8. The process as defined by claim 1, said temperature having been optimized.

9. The process as defined by claim 1, said essentially constant pressure being atmospheric pressure and said temperature ranging from about 145° to 165° C.

10. The process as defined by claim 1, comprising treated a granular, essentially unground rare earth ore.

11. The process as defined by claim 1, comprising treating a ground rare earth ore.

12. The process as defined by claim 1, said rare earth ore comprising a phosphate or fluocarbonate ore, or admixture thereof.

* * * * *